United States Patent
Carlson

(10) Patent No.: US 7,144,021 B2
(45) Date of Patent: Dec. 5, 2006

(54) FRONT SUSPENSION TUNING APPARATUS FOR VEHICLE WITH STRUTS

(75) Inventor: Andrew D. Carlson, Boca Raton, FL (US)

(73) Assignee: Steeda Autosports, Inc., Pompano Beach, FL (US)

( * ) Notice: Subject to any disclaimer, the term of this patent is extended or adjusted under 35 U.S.C. 154(b) by 148 days.

(21) Appl. No.: 10/816,654

(22) Filed: Apr. 2, 2004

(65) Prior Publication Data
US 2005/0218618 A1 Oct. 6, 2005

(51) Int. Cl.
*B60G 7/02* (2006.01)

(52) U.S. Cl. ............... 280/86.752; 280/86.753; 280/86.751

(58) Field of Classification Search ........... 280/86.751, 280/86.75, 86.752, 86.753, 86.754
See application file for complete search history.

(56) References Cited

U.S. PATENT DOCUMENTS

| | | | |
|---|---|---|---|
| 4,372,575 | A | 2/1983 | Hyma |
| 4,946,188 | A | 8/1990 | Key et al. |
| 5,484,161 | A | 1/1996 | McIntyre |
| 5,931,485 | A | 8/1999 | Mödinger et al. |
| 6,224,075 | B1 | 5/2001 | McIntyre |
| 6,257,601 | B1 | 7/2001 | Spears et al. |
| 6,328,321 | B1 | 12/2001 | Nolan |
| 6,485,223 | B1 | 11/2002 | Van Schmus et al. |

*Primary Examiner*—Eric Culbreth
(74) *Attorney, Agent, or Firm*—McHale & Slavin, P.A.

(57) ABSTRACT

The present invention provides a suspension tuning device for vehicles with struts. More specifically the suspension tuning device generally comprises an upper plate, two lower plates and a strut mounting plate. The plates are constructed to mount juxtaposed to a standard strut tower mounting member to permit quick front suspension alterations throughout an increased range when compared to the prior art.

17 Claims, 5 Drawing Sheets

FRONT SUSPENSION TUNING APPARATUS FOR VEHICLE WITH STRUTS

FIELD OF THE INVENTION

The present invention relates to a device for quickly and easily adjusting the caster and camber of a vehicle front suspension across a broader than normal range to tune the vehicle's suspension for racing and/or high performance street applications.

BACKGROUND OF THE INVENTION

The versatility and performance of newer muscle cars such as the FORD MUSTANG permit owners to use one vehicle for multiple purposes. Often the same vehicle used to carry groceries home from the supermarket is used for racing applications on the weekend. Owners will often modify their vehicle to make it more competitive in their chosen form of racing. One of the most modified areas of a vehicle for racing applications is the suspension.

Front suspension tuning can be one of the most critical aspects of getting a vehicle to handle properly for either street or racing applications. Unfortunately, front suspensions that are modified exclusively for racing typically will not work properly for street driving, and street suspensions typically do not work well for racing. One of the biggest challenges for a muscle car owner who races his vehicle has been to balance the vehicle for both uses.

The front wheel of a vehicle has three main alignment angles: camber, caster, and toe. Camber is the angle at which the top of the tire is tilted inwardly or outwardly, as viewed from the front of the car. If the top of the tires lean toward the center of the car you have negative camber. If the top of the tires are tilted outward you have positive camber. Typically, as the tires are turned left and right, the camber changes slightly because the pivoting points for the tires are not vertical as viewed from the side. Adjusting camber can have a dramatic affect on the cornering characteristics of a vehicle. For example, an oval track racer will often race with negative camber on the right side of the vehicle and positive camber on the left side of the vehicle. A drag racer will often race with neutral or slightly negative camber on both sides of the vehicle and a street vehicle will typically have camber set at zero or perpendicular to the street surface.

Caster is the angle at which the pivot points for tires are tilted, as viewed from the side. Caster is best understood by imagining an axis running through the uppermost wheel pivot and extending through the lowermost pivot. From the side, if the top of the axis tilts toward the back of the car you have positive caster, if the axis line tilts toward the front of the car you have negative caster. If a vehicle has positive caster, the uppermost pivot is behind the lower pivot and this causes the tire to tilt in more at the top as the tire is steered inward (camber gain).

Changing caster primarily affects four things: high speed stability, camber gain, bump steer characteristics and relative corner weights (wedge). Increasing caster generally increases straight line directional stability. This is good for an application such as drag racing; however, other parameters such as bump steer and wedge may be adversely affected making handling for applications such as street driving or road racing unacceptable. Excessive caster settings will increase required steering effort, cause excessive tire wear and reduce braking ability. Negative caster requires less steering effort but directional stability is adversely affected. Some racing applications may require different caster settings on each side of the vehicle. For example, oval track racers often run more positive caster on the right side wheel than the left. The caster split helps pull the car down into the turn, helps the car turn in the center of the turn, and helps the car maintain traction exiting the turn.

Accordingly, what is lacking in the art is a suspension tuning kit for vehicles with struts. The suspension tuning kit should achieve objectives such as providing: quick adjustment, increased suspension rigidity, increased range of adjustability reliable performance. The suspension tuning kit should include packaging flexibility for installation on various vehicle configurations including retrofitting existing vehicles with minimal modification of the original suspension system. The suspension tuning kit should facilitate independent caster and camber adjustment of each front wheel across the extended range. The suspension tuning kit should facilitate quick suspension changes to allow a vehicle to be driven to a racetrack, converted to a race setup and thereafter quickly converted back to a street driving setup for the trip home.

DESCRIPTION OF THE PRIOR ART

A number of prior art systems exist for adjusting the caster and/or camber of a vehicle which utilizes struts. Most of the systems utilize a combination of thin stamped metal plates and rubber bushings, while others use eccentric cams or jack bolts.

U.S. Pat. No. 4,372,575 teaches a vehicle wheel suspension including a strut member provided at its lower end with a wheel spindle and a connection with a lateral lower control arm. The device further includes mounting apparatus for attaching the upper end of the strut to a stamped sheet metal tower portion of the vehicle and provisions for adjustment of either wheel caster or wheel camber via a stamped sheet metal adjuster attached to the upper end of the strut.

U.S. Pat. No. 4,946,188 teaches an adjustment mechanism for a MacPherson strut of an automobile. The adjustment is provided by modifying the top bearing retainer to provide an inward circular lip. Two plates are clamped to this lip. Before clamping, the plates are rotatable relative to the bearing retainer so that the center of an eccentric hole therein moves along a circle which is concentric to the bearing retainer and thus the bearing. The upper end of the piston rod of the strut is mounted in the eccentric hole so that the position of the upper end of the strut can be moved relative to the body and also within the bearing and helical spring.

U.S. Pat. No. 5,484,161 teaches an adjustable mount for the upper end of a motor vehicle suspension strut, wherein a flange is located between a clamping plate and a face plate with studs passing from the clamping plate through enlarged apertures in the flange. Holes in the face plate and aligned holes in the top of the vehicle chassis suspension tower are securable by nuts. Before the nuts are tightened, the flange may be moved in a sliding fashion between the clamping plate and face plate to locate the bushing and upper end of the strut into the desired location for correct caster and camber settings. Reference is also made to the provision of screwdriver slots to permit the flange to be levered into the desired location using a screwdriver when the suspension is under load.

U.S. Pat. No. 5,931,485 teaches a support arrangement for a steered vehicle wheel mounted on a wheel carrier which is supported by a transverse link by way of a ball joint with a flange pivotally supported and mounted on the transverse link by clamping screws extending through spaced mounting holes in the transverse link and the mounting flange. The mounting holes in one of the transverse link and mounting flange is formed by at least three different receiving bores disposed at different distances from the pivot point of the flange for receiving the clamping screws and the mounting holes. In the other are holes elongated along a line extending through the pivot point between the transverse link and the flange and forming jointly with the screws stops which provide for positive engagement between the transverse link and the flange in each of the different relative pivot positions between the two.

U.S. Pat. No. 6,224,075 teaches a caster adjuster for a motor vehicle suspension, typically having a wishbone. The device is made adjustable by mounting the suspension upright ball joint in a housing having an offset spigot rotatable by an Allen key engaged in the spigot to move the ball joint backward and forward while the spigot is restrained by a slot in a location bracket engaged with the wishbone. Camber is adjusted by a threaded adjuster operable between the location bracket and the housing while allowing rotation of the housing relative to the bracket.

U.S. Pat. No. 6,257,601 teaches an adjustable strut mounting plate for correcting at least one alignment parameter of a motor vehicle wheel assembly, with the adjustable strut mounting plate comprising an annular body adapted for secure attachment to the original strut mounting plate of the motor vehicle. The adjustable strut mounting plate includes a plurality of elongated ribbed adjustment bores through which bolts pass to secure the original strut mounting plate to the adjustable mounting plate. In addition, right hand and left hand tower mounting bores are provided in the adjustable strut mounting plate to accommodate attachment of the combined adjustable strut plate with the original strut plate to the vehicle tower.

U.S. Pat. No. 6,328,321 teaches an adjustable mount for the upper end of a vehicle suspension strut allowing the strut to be relocated relative to a vehicle chassis member. The mount comprises a bush adapted to receive and secure the upper end of the strut, a flange extending radially outwardly from the bush, and a clamping plate adapted to abut the lower face of the flange. The flange has upper and lower faces, and the clamping plate has an opening therethrough larger than the perimeter of the bush such that the clamping plate can relatively slide over the lower face of the flange over a limited area. A plurality of studs extend upwardly from the clamping plate. The studs are located outside the periphery of the flange and restrict the sliding movement of the flange relative to the clamping plate by engagement with the periphery of the flange.

U.S. Pat. No. 6,485,223 teaches a caster-camber plate assembly which includes a base plate, a main plate and a strut top mounting plate. The base plate includes four spaced apart main plate fastening members attached thereto. The main plate includes four spaced apart strut top mounting plate fastening members attached thereto. The main plate has the main plate fastening members extending therethrough for attaching the base plate adjacent to a first side of the main plate and is capable of being moved with respect to the base plate along a first translation axis. The strut top mounting plate is positioned adjacent to the main plate with the four strut top mounting plate fastening members extending therethrough. The strut top mounting plate is capable of being moved with respect to the main plate along a second translation axis. The second translation axis extends approximately perpendicular to the first translation axis. A central axis of the strut top mounting plate is positioned within an area defined between the main plate fastening members and within an area defined between said strut top mounting plate fastening members.

The construction of this device places the strut mount plate on top of the main plate, whereby a catastrophic fastener failure will result in the strut being thrust through the vehicle hood and loss of vehicle control. Moreover, the strut mounting position (height) within this device prevents the strut from being positioned at the original equipment manufacturers (OEM) suggested height. Still yet this construction requires spacers between the main plate and the strut tower to accommodate the heads of the fasteners. The spacers reduce the contact area between the main plate and the strut tower thereby reducing rigidity of the vehicle front suspension.

As disclosed, the above devices fail to teach or suggest a suspension tuning mechanism capable of the large range of caster and/or camber adjustments required for high performance applications. The prior art is also deficient in teaching a suspension tuning mechanism capable of providing the caster and/or camber travel required to properly align the front wheels of vehicles having lowered ride heights. Still further, the prior art devices do not provide the suspension rigidity and stability required by high performance and/or racing vehicles.

SUMMARY OF THE INVENTION

The present invention provides a suspension tuning device for vehicles with struts. More specifically the suspension tuning device generally comprises an upper plate, two lower plates and a strut mounting plate. The plates are constructed to mount juxtaposed to a standard strut tower to permit quick front suspension alterations throughout an increased range when compared to the prior art.

The pre-existing vehicle strut tower includes a thin sheet metal mounting member constructed for attaching the upper portion of a strut member via a stamped metal plate. The mounting member typically includes three elongated slots arranged to cooperate with the stamped metal plate to permit the upper portion of the strut member to be pivoted inward for a small amount of camber adjustment. The prior art caster/camber adjustment combination provides only a small amount of adjustment and typically requires the strut to be uncoupled or unloaded to complete the adjustment.

The instant invention provides a suspension tuning kit which replaces the stamped metal strut attachment plate of the prior art. The upper plate of the instant invention is constructed of billet aluminum and includes increased thickness when compared to the prior art. The upper plate includes a top surface and a bottom surface, the bottom surface positioned juxtaposed to the upper surface of the strut tower to increase the rigidity of the strut tower. The upper plate also includes an outer contoured perimeter and at least one rounded lower corner which allow the plate to be moved over a broad range without interference from the inner fender wall. The upper plate includes four camber adjustment slots extending through the plate with one slot being substantially longer than the other three. The shorter slots are constructed and arranged to cooperate with the existing three camber adjustment slots in the mounting member of the strut tower to permit extended travel. The longer slot cooperates with a round aperture which is drilled through the mounting surface of the strut tower. The longer slot and the added fastener further increase rigidity and stability of the assembly.

The upper plate also includes a contoured cavity which extends upward into the upper plate from the bottom surface.

The cavity includes a centrally located oval shaped aperture and a plurality of elongated caster adjustment slots arranged substantially transverse to the camber adjustment slots. The contoured cavity and the oval aperture cooperate to partially enclose the strut mounting plate while still permitting the strut mounting plate to slide for caster adjustment. Partially enclosing the strut mounting plate prevents the upper portion of the strut from becoming loose in the event of a fastener failure.

The strut mounting plate is preferably machined from a steel billet and includes a flat plate portion and a centrally located upwardly extending boss. The flat plate portion includes a plurality of threaded apertures arranged to align with the elongated caster slots in the upper plate. Fasteners extend through the elongated caster slots in the upper plate and threadably engage the threaded apertures to secure the mounting plate in a predetermined position with respect to the upper plate. The boss includes a centrally located bore adapted to secure the upper end of a strut. The bore may optionally include a resilient isolation element or a hemispherical element for allowing the strut to pivot a predetermined amount.

The first lower plate is generally L-shaped and preferably includes three studs affixed substantially perpendicular with respect to one of the side faces. The first lower plate is located juxtaposed to the lower surface of the mounting portion of the strut tower with the studs extending through the pre-existing slots in the mounting member of the strut tower and the three short slots in the upper plate. Three threaded nuts cooperate with the threaded studs extending through the upper plate to allow the upper plate to be secured in a selected position with respect to the strut tower.

The second lower plate is generally rectangular and includes one stud affixed substantially perpendicular to one side thereof. The second lower plate is also located juxtaposed to the lower surface of the mounting member of the strut tower with the stud extending through the drilled aperture and the long slot in the upper plate. The second lower plate may also include a means of attaching the second lower plate to the strut tower to prevent rotation thereof during adjustment of the upper plate. A threaded nut cooperates with the threaded stud extending through the drilled aperture and the upper plate to allow the upper plate to be secured in a selected position with respect to the strut tower. The first and second lower plates cooperate with the upper plate to sandwich the mounting member of the strut tower adding significant rigidity and stability to the assembly when compared to the prior art.

The suspension tuning kit may be installed on either one or both sides of the front suspension of the vehicle and each strut may be independently adjusted to suit the driver's needs.

Accordingly, it is an objective of the present invention to provide a suspension tuning kit for vehicles with struts.

Yet an additional objective of the present invention is to provide a suspension tuning kit for vehicles with struts which allows rapid suspension changes without disconnection of the strut.

It is a further objective of the present invention to provide a suspension tuning kit for vehicles with struts that allows an increased range of adjustment when compared to prior art devices.

A still further objective of the present invention is to provide a suspension tuning kit for vehicles with struts which includes sandwich construction and additional fasteners to provide additional rigidity and support to the vehicle suspension system.

Another objective of the present invention is to provide a suspension tuning kit for vehicles with struts which is simple to install and which is ideally suited for original equipment and aftermarket installations.

Yet another objective of the present invention is to provide a suspension tuning kit for vehicles with struts that can be inexpensively manufactured and which is simple and reliable in operation.

Still another objective of this invention is to provide a suspension tuning kit for vehicles with struts or coil over shocks which utilizes a two piece base plate construction.

Still yet another objective of the instant invention is to provide a suspension tuning kit for vehicles with struts which maintains limited control of the strut or coil over shock in the event of a strut mounting plate fastener failure.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Although the invention is described in terms of a preferred specific embodiment, it will be readily apparent to those skilled in this art that various modifications, rearrangements and substitutions can be made without departing from the spirit of the invention. The scope of the invention is defined by the claims appended hereto.

Figure 1:
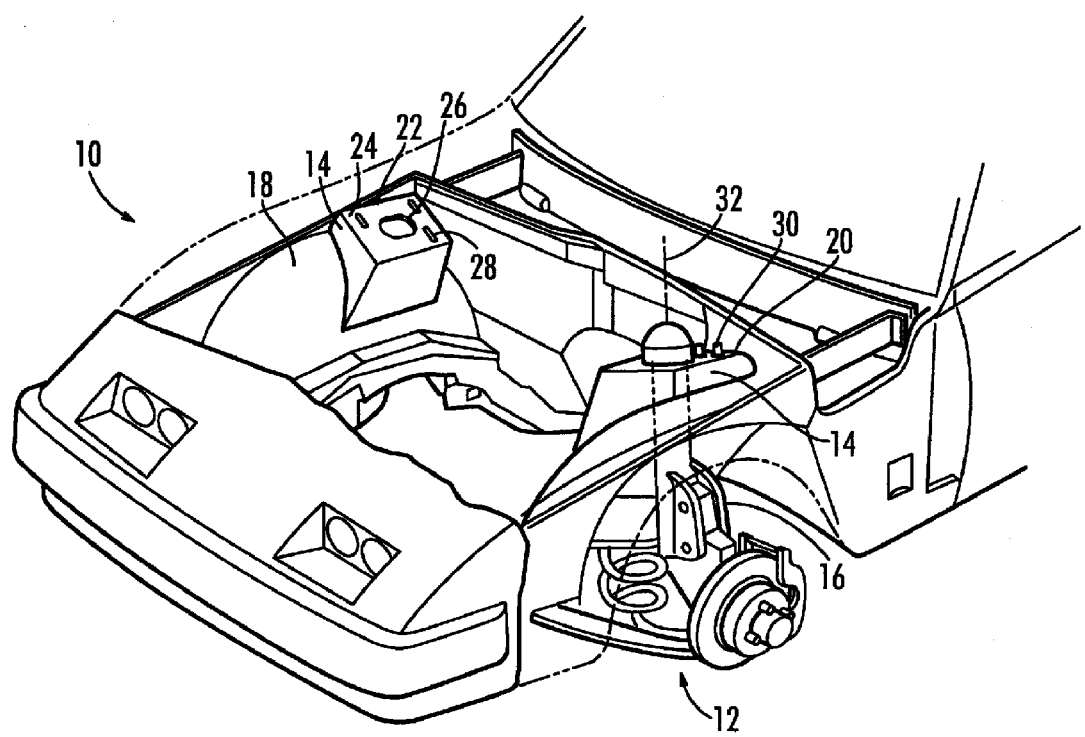
FIG. 1 is a perspective view illustrating the front portion of a vehicle equipped with a strut front suspension.

Referring to FIG. 1, the front portion of a vehicle 10 equipped with a strut suspension is shown. The strut suspension 12 includes a pair of strut towers 14. The strut towers are typically formed from sheet metal by methods well known in the art and are secured to the inner fender wall structure 18 on both the left side 20 and right side 22 of the vehicle. Each strut tower includes a mounting member 24 oriented in a plane substantially orthogonal with respect to the longitudinal axis 32 of the corresponding strut 16. The mounting member 24 generally includes a strut aperture 26 and three elongated camber adjustment slots 28. The elongated camber adjustment slots are arranged generally parallel with respect to each other and spaced around the strut axis 32. The upper end of a strut member 16 is secured to the mounting member via a stamped sheet metal member 30. The sheet metal member 30 cooperates with the three camber adjustment slots 28 to permit the upper end of the strut member to be pivoted inward toward the center of the car for a small amount of camber adjustment.

Figure 2:
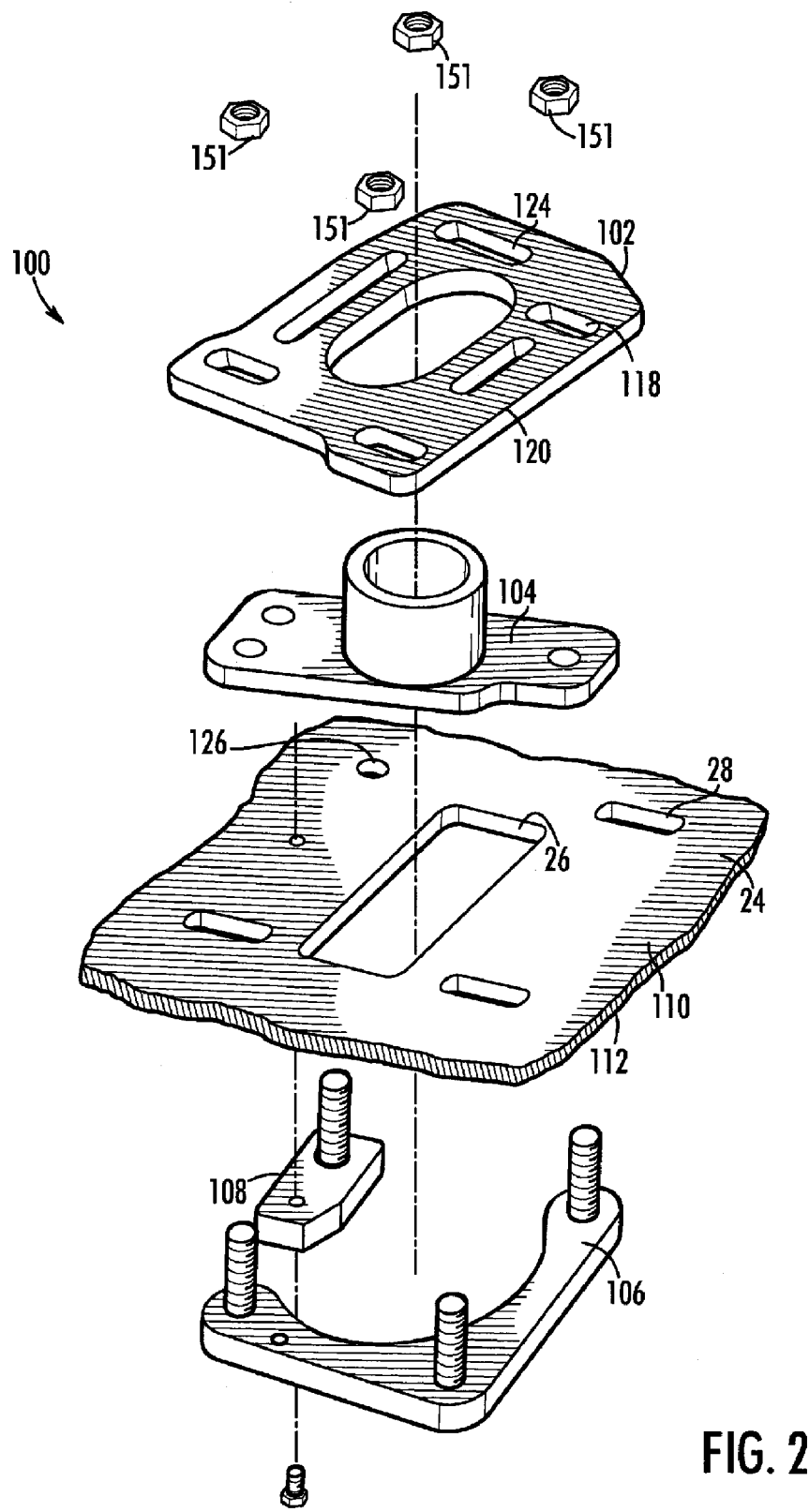
FIG. 2 is a perspective exploded view of the instant invention and a portion of the strut tower mounting member of the vehicle illustrated in FIG. 1.
Figure 3:
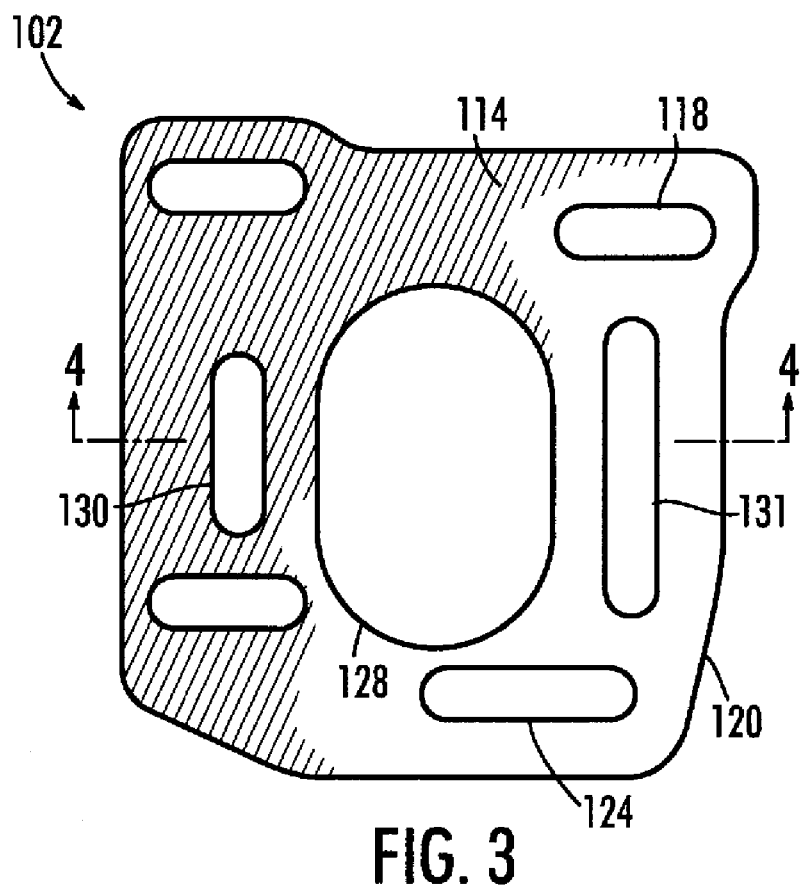
FIG. 3 is a top view of the upper plate of the instant invention.
Figure 4:
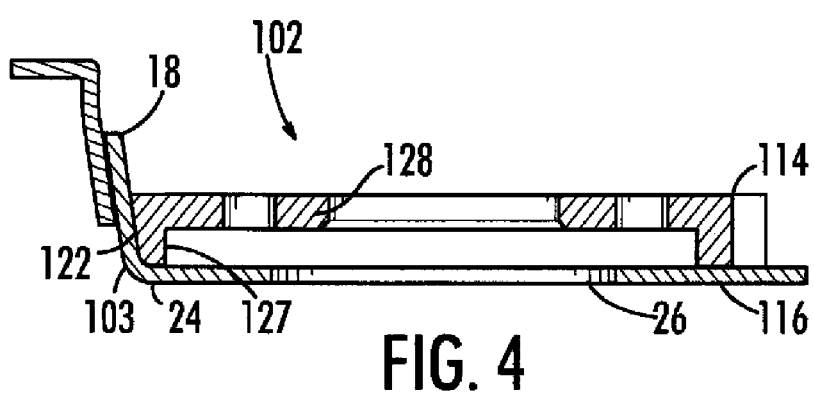
FIG. 4 is a section view of the upper plate taken along lines 4—4 of FIG. 3.

Referring to FIG. 2, an exploded view of the instant invention is illustrated. The instant invention provides a suspension tuning kit 100 which replaces the stamped metal strut attachment plate 30 (FIG. 1) of the prior art. The suspension tuning kit 100 comprises an upper plate 102, a strut mounting plate 104, a first lower plate 106 and a second lower plate 108.

Referring to FIGS. 2–5, the upper plate 102 is illustrated. The upper plate 102 includes an outter contoured edge 120, a top surface 114, a bottom surface 116 and at least one rounded bottom corner 122. In a most preferred and non-limiting embodiment, the upper plate is constructed of aluminum and is about 0.590 of an inch thick. It should be appreciated that the upper plate may be made thinner or thicker as the space requirements, materials and wheel loads require. The upper plate may alternatively be made from other metals which may include, but should not be limited to, steel, titanium or suitable combinations thereof. The contoured outer edge 120 and the rounded bottom corner 122 cooperate to allow the upper plate 102 to be moved over a broad range while assembled juxtaposed to the upper surface to the strut tower without interference between the upper plate 102 and the inner fender wall 18. The radiused lower corner 122 is particularly adapted to allow the upper plate 102 to abut the fillet 103 where the inner fender wall 18 and strut tower 14 (FIG. 1) are joined. The upper plate 102 includes four secondary camber adjustment slots 118, 124 extending through the upper plate with one secondary camber adjustment slot 124 being substantially longer than the other three. The shorter slots 118 are constructed and arranged to cooperate with the existing three camber adjustment slots 28 in the mounting member 24 of the strut tower 14. The longer slot 124 cooperates with a round aperture 126 (FIG. 2) which is drilled through the mounting surface 24 of the strut tower 14. In the preferred embodiment the existing camber adjustment slots 28 cooperate with the secondary camber adjustment slots 118, 124 to allow about three degrees of camber adjustment. In a most preferred embodiment the camber adjustment slots are constructed and arranged to allow wheel camber to be adjusted between about 0 degrees and about –3 degrees.

"The upper plate 102 also includes a contoured cavity 127 which extends upward into the bottom surface 116 and a centrally located oval shaped aperture 128. The contoured cavity 127 and the oval aperture 128 cooperate to partially enclose the strut mounting plate while permitting caster adjustment with or without disconnection of the strut member 16 (FIG. 1). In a most preferred nonlimiting embodiment, the cavity extends about 0.300 of an inch into the upper plate. It should also be appreciated that the cavity depth may be varied to accommodate space, material and wheel load requirements. At least two caster adjustment slots 130, 131 extend through the top surface 114 into the cavity 127 and are arranged to have a substantially transverse axis to the camber adjustment slots 118 and 124. In the preferred embodiment one of the caster adjustment slots 131 is longer than caster adjustment slot 130. The longer caster adjustment slot 131 is constructed and arranged to accommodate two spaced apart fasteners for increased securement of the strut mounting plate. In the preferred embodiment the caster adjustment slots 130, 131 are constructed and arranged to allow about 3 degrees of adjustment. In a most preferred embodiment, the caster adjustment slots allow the caster to be adjusted between about +4 degrees to about +7 degrees."

Figure 5:
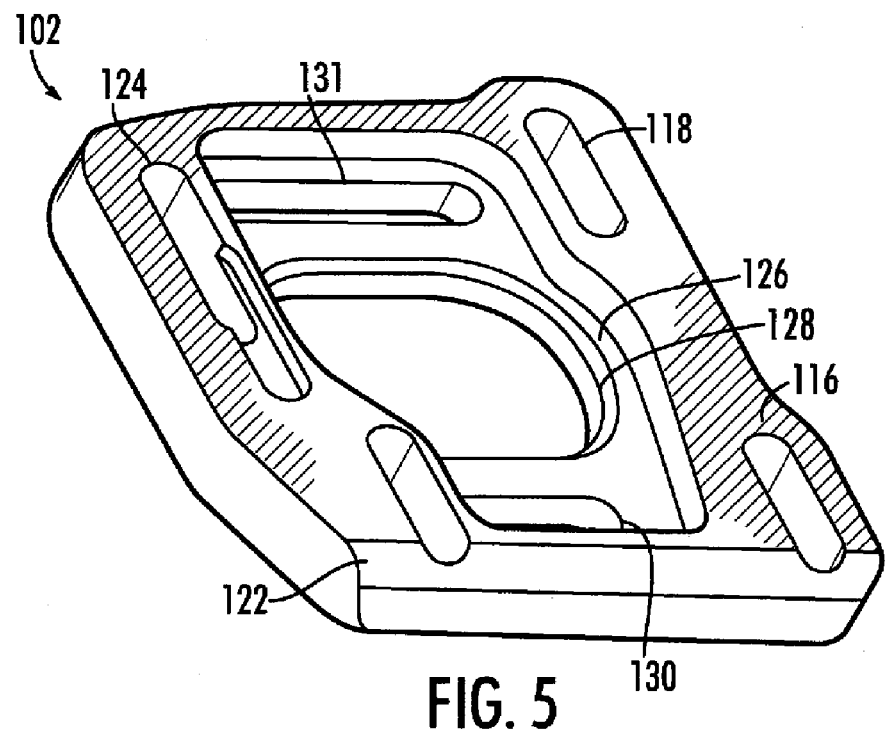
FIG. 5 is a bottom perspective view of the upper plate shown in FIG. 3.
Figure 6:
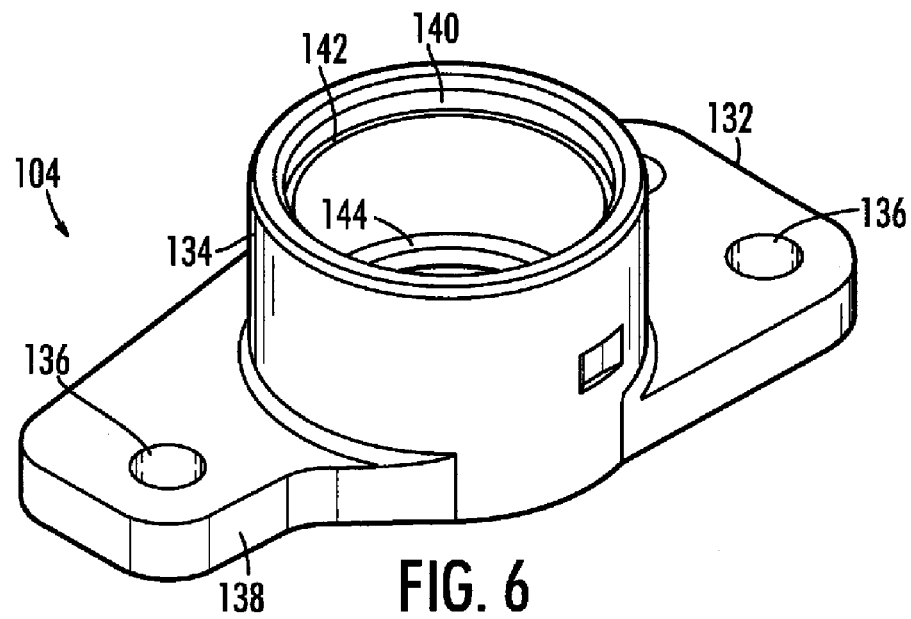
FIG. 6 is a perspective view of the strut mounting member of the instant invention.

Referring to FIG. 6, a strut mounting plate 104 is illustrated. In the preferred embodiment, the strut mounting plate includes a flat plate portion 132 and an integrally formed upwardly extending boss 134. The outer edge 138 of the flat plate portion is contoured and sized to fit into the upper plate cavity 127 (FIG. 5). The flat plate portion includes at least two and preferably three threaded apertures 136. The apertures are arranged to align with the caster adjustment slots 130, 131 in the upper plate 102. A plurality of threaded fasteners (not shown) extend through the upper plate caster slots 130, 131 and cooperate with the threaded apertures 136 to permit the strut mounting plate to be secured in a desired position with respect to the upper plate. In a most preferred embodiment the flat plate portion is about 0.285 of an inch thick. The thickness of the flat plate portion and the upper plate cavity depth cooperate to allow the strut mounting plate to be slid into a desired caster position while the upper plate is secured in place with respect to the strut tower. The upwardly extending boss 134 includes a bore 140 extending therethrough. The bore is constructed and arranged to secure the upper end of a strut member 16 (FIG. 1). In the preferred embodiment the bore 140 includes a resilient member or hemispherical member (not shown). Snap rings, well known in the art, cooperate with an upper snap ring groove 142 and a lower snap ring groove 144 to retain the resilient or hemispherical member within the bore. The resilient member and the hemispherical member are constructed and arranged to cooperate with the upper end of the strut member 16 to allow the strut member to pivot a predetermined amount.

The strut mounting plate 104 is preferably machined as a single piece from a metal such as steel. However, other materials such as aluminum and/or titanium may also be used. In addition, the strut mounting plate may be made from a plurality of pieces and attached together by methods well known in the art.

Figure 7:
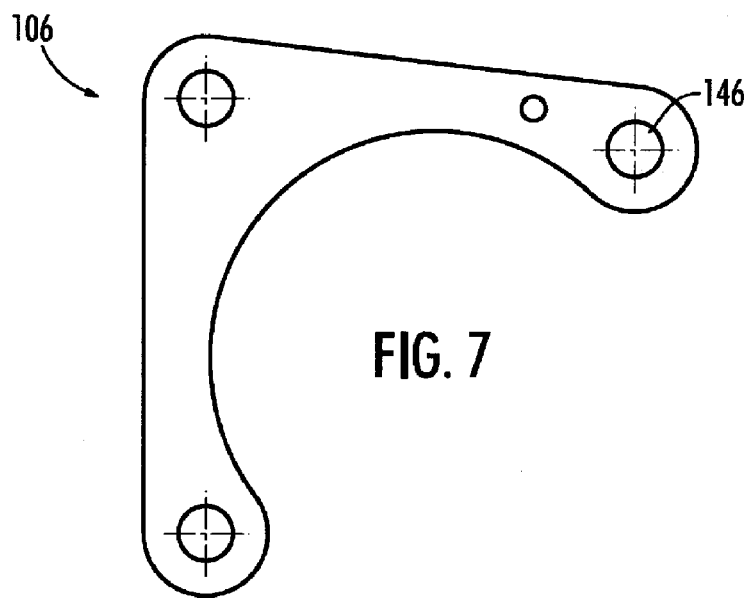
FIG. 7 is a top view of the first lower plate of the instant invention.
Figure 8:
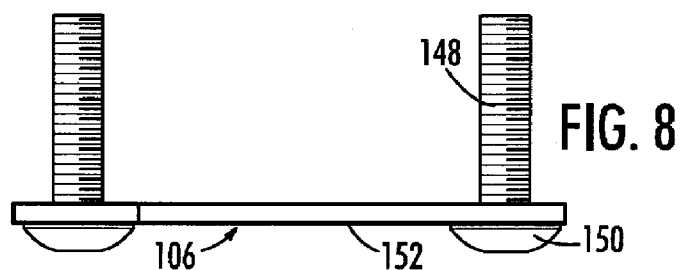
FIG. 8 is a side view of the first lower plate of the instant invention.

Referring to FIGS. 7–8, the first lower plate 106 is illustrated. The first lower plate is generally L-shaped and includes three fastener apertures 146 therethrough. The three fastener apertures are constructed and arranged to align with the strut tower camber slots 28 and the upper plate camber adjustment slots 118 (FIG. 2). In the preferred embodiment a first group of threaded fasteners 148 extend through the fastener apertures 146 and the heads 150 are secured to the lower side face 152 via weldment. The first lower plate 106 is positioned parallel and juxtaposed to the bottom surface of the mounting member 24 of the strut tower 14. The first group of threaded fasteners 148 have sufficient length to extend through the mounting member of the strut tower and the upper plate. At least three threaded nuts 151 cooperate with said first group of fasteners to secure the upper plate in a selected position with respect to the strut tower.

Figure 9:
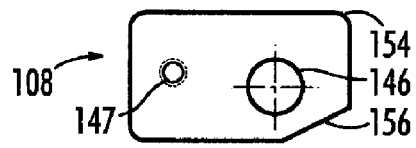
FIG. 9 is a a top view of the second lower plate of the instant invention.
Figure 10:
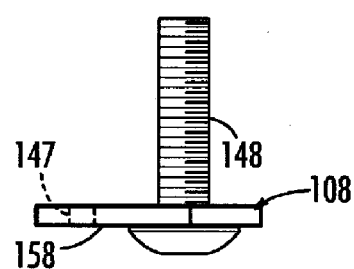
FIG. 10 is a side view of the second lower plate of the instant invention.

Referring to FIGS. 9–10, the second lower plate 154 is illustrated. The second lower plate is generally rectangular and includes a beveled corner 156 and at least one aperture 146. In the preferred embodiment a fourth threaded fastener 148 extends through the fastener aperture 146 and the head of the fastener is secured to the lower side face 158 via weldment. The second lower plate 108 is positioned parallel and juxtaposed to the bottom surface of the mounting member 24 of the strut tower 14. The threaded fastener 148 has sufficient length to extend through the drilled aperture 126 in the mounting member of the strut tower and the upper plate 102. A threaded nut (not shown) cooperates with the fourth fastener to secure the upper plate in a selected position with respect to the strut tower. In addition, the second lower plate may include a means for preventing rotation of the second lower plate with respect to the strut tower mounting member, illustrated herein as a threaded aperture 147. The threaded aperture is generally constructed and arranged to cooperate with a second drilled aperture shown schematically located in said mounting in FIG. 2 member 24 of said strut tower, wherein a threaded fastener shown schematically in FIG. 2 extends downward through said mounting member and threadably engages the threaded aperture, whereby rotation of the second lower plate is prevented.

In this manner, the front wheel camber of a vehicle may be selectively adjusted along an extended axis by loosening the first group of three fasteners and the fourth threaded fastener for movement of the upper plate, first lower plate and second lower plate relative to the mounting member of the strut tower. Once the plates have been positioned to cause the front wheel to have the desired amount of camber the nuts are tightened by means well known in the art to secure the plates and thereby the wheel in place. The front wheel caster may be selectively adjusted along an extended axis by loosening the third group of threaded fasteners for movement of the strut mounting plate relative to the upper plate and the mounting member of the strut tower. The construction of the suspension tuning device allows the wheel caster to be adjusted without loosening the upper plate and without adjusting camber settings.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. In a front vehicle suspension, wherein said suspension includes a left and a right strut, each said strut including a top end, a bottom end and a longitudinal centerline, said longitudinal centerline defining a strut axis, a left and a right structural strut tower, said left and said right strut towers each including a mounting member oriented in a plane substantially orthogonal with said respective left and said right strut axes, said mounting members each including three elongated camber slots, said camber slots on parallel axes and spaced about said strut axes, said mounting members having a top surface and a bottom surface, wherein said top end of said left strut attaches to said left strut tower mounting member via said camber slots positioned in said left mounting member, wherein said top end of said right strut attaches to said right strut tower mounting member via said camber slots positioned in said right mounting member, wherein said camber slots in both said left and said right mounting members respectively are oriented to allow a top portion of said respective strut axes to be tilted toward the center of said vehicle, a suspension tuning kit comprising:

an upper plate, said upper plate having a top surface and a bottom surface, said upper plate having four substantially parallel secondary camber slots, wherein three of said secondary camber slots are constructed and arranged to align with said mounting member camber slots, wherein one of said secondary camber slots is longer than the other three secondary camber slots, wherein said longer secondary camber slot aligns with a drilled aperture, wherein said drilled aperture is located in either of said left or said right respective mounting member of either of said left or said right respective strut tower, said upper plate including at least two caster slots, said at least two caster slots arranged to have substantially parallel axis with respect to each other and transverse axes with respect to said secondary camber slots of either said left or said right strut axes respectively and spaced about either said left or said right strut axis respectively, said bottom surface including a contoured cavity, said contoured cavity constructed and arranged for slidably locating a strut mounting plate, said bottom surface positionable parallel and juxtaposed to said top surface of either said left or said right strut tower mounting member respectively;

a strut mounting plate, said strut mounting plate including a lower plate portion, said lower plate portion including a bottom surface and a top surface, said top surface including an upwardly extending boss, said upwardly extending boss including a bore therethrough for mounting said top end of either said left or said right strut respectively, said lower plate portion including at least two threaded apertures, said at least two threaded apertures arranged to align with said at least two caster slots, said strut mounting plate slidably mounted within said upper plate cavity, said bottom surface mounted juxtaposed to either of said left or said right mounting member top surfaces respectively;

a first lower plate, said first lower plate including three apertures therethrough, said three apertures constructed and arranged to align with said camber slots, said first lower plate positioned parallel and juxtaposed to said bottom surface of either of said left or said right mounting member respectively;

a second lower plate, said second lower plate including at least one aperture therethrough, wherein said at least one aperture is constructed and arranged to cooperate with said drilled aperture, said second lower plate positioned parallel and juxtaposed to said bottom surface of either said left or said right mounting member respectively;

wherein said kit may be secured to said left or said right strut tower, wherein at least four threaded fasteners extend through said lower plates, said mounting member and said upper plate, said threaded fasteners cooperating with at least four threaded nuts, wherein said threaded fasteners cooperate with said nuts to secure said suspension tuning kit to either said left or said right strut tower mounting member respectively, wherein wheel caster and camber is infinitely adjustable throughout an extended range.

2. The suspension tuning kit as set forth in claim 1 wherein said first lower plate is substantially L-shaped, said L-shaped first lower plate including a top surface and a bottom surface.

3. The suspension tuning kit as set forth in claim 2 wherein at least three of said four threaded fasteners are weldably secured to said bottom surface of said first lower plate, said at least three threaded fasteners extending upward and substantially perpendicular to said top surface.

4. The suspension tuning kit as set forth in claim 2 wherein said first lower plate is constructed from metal.

5. The suspension tuning kit as set forth in claim 1 wherein said second lower plate is substantially rectangular in shape, said second lower plate including a top surface and a bottom surface, wherein at least one of said four threaded fasteners is weldably secured to said bottom surface of said second lower plate, said at least one threaded fastener extending upward and substantially perpendicular to said top surface.

6. The suspension tuning kit as set forth in claim 5 wherein said second lower plate includes a means for preventing rotation of said second lower plate with respect to said strut tower mounting member.

7. The suspension tuning kit as set forth in claim 6 wherein said means for preventing rotation includes a threaded aperture, wherein said threaded aperture is constructed and arranged to cooperate with a second drilled aperture located in either said left or said right mounting member of said left or said right strut tower respectively, wherein a threaded fastener extends downward through said respective mounting member and threadably engages said threaded aperture, whereby rotation of said second lower plate is prevented.

8. The suspension tuning kit as set forth in claim 1 wherein said upper plate includes a contoured outer edge, wherein said contoured outer edge is constructed and arranged to permit extended movement of said upper plate with respect to said left or said right strut tower.

9. The suspension tuning kit as set forth in claim 8 wherein said upper plate includes at least one rounded corner extending between said bottom surface and said contoured edge, wherein said rounded corner is constructed and arranged to abut an inner fender wall.

10. The suspension tuning kit as set forth in claim 1 wherein said upper plate is made of steel.

11. The suspension tuning kit as set forth in claim 1 wherein said upper plate is made of aluminum.

12. The suspension tuning kit as set forth in claim 1 wherein said upper plate is made of titanium.

13. The suspension tuning kit as set forth in claim 1 wherein said strut mounting plate bore includes at least one snap ring groove, wherein said bore is constructed and arranged to accept a hemispherical connector member, wherein said hemispherical connector member is constructed and arranged to pivotally secure said top end of said strut member, wherein said at least one snap ring groove cooperates with at least one snap ring to secure said hemispherical member.

14. The suspension tuning kit as set forth in claim 1 wherein said camber adjustment range facilitates adjusting either said left or said right strut axis up to about three degrees.

15. The suspension tuning kit as set forth in claim 1 wherein said camber adjustment range facilitates adjusting either said left or said right strut axis from about 0 degrees to about −3 degrees.

16. The suspension tuning kit as set forth in claim 1 wherein said caster adjustment facilitates adjusting either said left or said right strut axis up to about three degrees.

17. The suspension tuning kit as set forth in claim 1 wherein said caster adjustment facilitates adjusting either said left or said right strut axis from about +4 degrees to about +7 degrees.

* * * * *